(12) United States Patent
Gu et al.

(10) Patent No.: US 10,768,472 B2
(45) Date of Patent: *Sep. 8, 2020

(54) DISPLAY DEVICE

(71) Applicant: LG DISPLAY CO., LTD., Seoul (KR)

(72) Inventors: Dong-Hyo Gu, Kunpo-si (KR);
Min-Cheol Shin, Incheon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 10 days.

This patent is subject to a terminal disclaimer.

(21) Appl. No.: 15/834,671

(22) Filed: Dec. 7, 2017

(65) Prior Publication Data

US 2018/0157108 A1    Jun. 7, 2018

Related U.S. Application Data

(63) Continuation of application No. 08/889,732, filed on Jul. 8, 1997, now Pat. No. 9,857,621.

(30) Foreign Application Priority Data

Jul. 15, 1996 (KR) .................................. 96-28526

(51) Int. Cl.
*G02F 1/1335* (2006.01)
*G02B 3/00* (2006.01)
*G02F 1/13357* (2006.01)

(52) U.S. Cl.
CPC ..... *G02F 1/133526* (2013.01); *G02B 3/0056* (2013.01); *G02F 1/133621* (2013.01); *G02F 1/133512* (2013.01)

(58) Field of Classification Search
CPC ..................... G02F 1/133526; G02F 1/133621
See application file for complete search history.

(56) References Cited

U.S. PATENT DOCUMENTS 5,101,279 A    3/1992  Kurematsu et al.
5,151,801 A *  9/1992  Hiroshima ........ G02F 1/133526
                                                            349/95

(Continued)

FOREIGN PATENT DOCUMENTS

EP    0 366 462 A2    5/1990
EP    0 425 266 A2    5/1991

(Continued)

OTHER PUBLICATIONS

Japanese Abstract #JP-60262131A, Publication date: Dec. 25, 1985.
Machine translation of JP 5-241140, Sep. 1993, pp. 1-6.

*Primary Examiner* — Dung T Nguyen
(74) *Attorney, Agent, or Firm* — Birch, Stewart, Kolasch & Birch, LLP

(57) ABSTRACT

A display device includes first and second transparent substrates; a plurality of gate bus lines and data bus lines on the first transparent substrate to define a plurality of pixels; a plurality of color filter layers under the second transparent substrates; and a plurality of microlenses under one of the first and second transparent substrates at positions corresponding to the gate and data bus lines, wherein at least two microlenses among the plurality of microlenses are corresponded to each of the gate or data bus lines in a width direction of each of the gate or data bus lines, and wherein a border between the at least two microlenses is substantially aligned with a center of a corresponding one of the gate and data bus lines, and wherein at least one microlens overlapped with one data bus line does not overlap with the other data bus lines.

20 Claims, 10 Drawing Sheets

(56) References Cited

U.S. PATENT DOCUMENTS

| | | |
|---|---|---|
| 5,187,599 A | 2/1993 | Nakanishi et al. |
| 5,239,412 A | 8/1993 | Naka et al. |
| 5,349,453 A | 9/1994 | Munakata |
| 5,442,482 A | 8/1995 | Johnson et al. |
| 5,473,453 A | 12/1995 | Kurematsu |
| 5,600,456 A * | 2/1997 | Maruyama ........ G02F 1/133504 349/64 |
| 5,606,436 A | 2/1997 | Shapiro |
| 5,666,175 A | 9/1997 | Spitzer et al. |
| 5,693,967 A | 12/1997 | Park et al. |
| 5,764,318 A | 6/1998 | Kurematsu et al. |
| 5,767,559 A | 6/1998 | Ito et al. |
| 5,808,712 A | 9/1998 | Hishida et al. |
| 5,811,322 A | 9/1998 | Robinson |
| 5,877,040 A | 3/1999 | Park et al. |
| 6,376,270 B1 | 4/2002 | Gu et al. |
| 6,433,844 B2 | 8/2002 | Li |
| 9,184,209 B2 | 11/2015 | Onakado et al. |
| 9,857,621 B1 * | 1/2018 | Gu ................... G02F 1/133526 |

FOREIGN PATENT DOCUMENTS

| | | |
|---|---|---|
| EP | 0 425 266 A3 | 5/1991 |
| EP | 0 718 665 A2 | 6/1996 |
| EP | 0 718 665 A3 | 4/1997 |
| GB | 2 279 171 A | 12/1994 |
| JP | 60-165621 A | 8/1985 |
| JP | 60-262131 A | 12/1985 |
| JP | 61-11788 A | 1/1986 |
| JP | 63-64023 A | 3/1988 |
| JP | 4-221929 A | 8/1992 |
| JP | 5-241140 A | 9/1993 |
| JP | 5-249455 A | 9/1993 |
| JP | 8-50283 A | 2/1996 |
| JP | 9-43427 A | 2/1997 |

* cited by examiner

DISPLAY DEVICE

CROSS-REFERENCE TO RELATED APPLICATIONS

This Application is a Continuation of co-pending U.S. patent application Ser. No. 08/889,732 filed on Jul. 8, 1997, which claims the benefit under 35 U.S.C. § 119(a) to Korean Patent Application No. P96-28526 filed on Jul. 15, 1996, all of which are hereby expressly incorporated by reference into the present application.

BACKGROUND OF THE INVENTION

Field of the Invention

The present invention relates generally to a transmissive-type display device ("transmissive display device"). More particularly, the present invention relates to a dot matrix type display device having a display panel and multiple picture elements ("pixels") arranged in a matrix to form a liquid crystal display ("LCD"), wherein the display panel is provided with an array of microlenses.

Description of the Related Art

In general, LCDs are comprised of upper and lower substrates facing each other as shown in FIG. 1. The lower substrate includes a plurality of pixel electrodes 13 formed on a transparent glass substrate 10. Data bus lines 12 are formed parallel to each other in a horizontal direction, and gate bus lines 11 are formed parallel to each other in a vertical direction. Between the data bus lines 12 and the gate bus lines 11, an array of the pixel electrodes 13 are formed.

On the transparent substrate 10, switching elements such as thin film transistors 15 ("TFTs") are disposed for the respective pixels at each crossing area where the gate bus lines 11 and the data bus lines 12 cross each other. The pixel electrodes 13 are electrically connected to the output electrodes (e.g., drains) of the TFTs 15.

On the other hand, the upper substrate includes a color filter layer 21 formed on a transparent glass substrate 20 and common electrodes 22 formed on the color filter layer 21. As shown in FIG. 2, the color filter layer 21 includes a red color filter 21R, a green color filter 21G, and a blue color filter 21B successively formed on the substrate 20. Among the different arrangements of color filters, the mosaic-array is employed in an audio video (AV) mode and the striped array is used in an office automation (OA) mode.

Once the upper and lower substrates are individually formed, it is necessary to join them for injecting liquid crystal 24 therebetween. The upper substrate and the lower substrate may be joined so that the color filter layer 21 faces the pixel electrodes 13 formed on the transparent glass substrate 10.

Additionally, a black matrix 14 is formed over the gate bus lines 11 and the data bus lines 12 corresponding to the border of the each color filter 21R, 21G and 21B. The black matrix 14 shields light which may have leaked from the gaps formed between the bus lines and the pixel electrodes 13, and improves the contrast of the LCD by making the borders of the color filters more clear.

Generally, the size of the black matrix 14 is larger than that of each bus line because of the misalignment arising from joining the upper substrate with the lower substrate. The gate bus lines 11 and the data bus lines 12 are approximately 15 µm-40 µm and 10 µm-25 µm wide, respectively. Therefore, the black matrix 14 is slightly wider than the bus lines.

In the conventional LCDs having the above described elements, a light source is located at the backside of the transparent glass substrate 20. The black matrix 14 is formed on the transparent glass substrate 10 to cover the gate bus lines 11 and data bus lines 12. The light from the light source, as depicted with a straight line in FIG. 2, is transmitted through the transparent glass substrate 20, the color filters 21R, 21G and 21B, the common electrodes 22 and the liquid crystal 24, sequentially. This light passes through the portion of transparent glass substrate 10 having the pixel electrodes 13 thereon. But, the light impinging on the gate and data bus lines 11 and 12 are blocked by the black matrix 14. As a result, the aperture ratio of the LCD and the brightness of the device is reduced.

The aperture ratio is expressed by "the effective area of all the pixels" divided by "the total display area". The aperture ratio equals the ratio of the recoverable light to all incident light (recoverable and unrecoverable light). (The unrecoverable light is the light blocked by the untransmissive portion of the display panel, and does not contribute to displaying.) As the size of the untransmissive portion increases, the aperture ratio decreases. The reduced aperture ratio leads to reproduction of dark pictures and poor image quality.

The LCDs may include a storage capacitor for assisting the cell capacitance of the LCDs. There are two types of storage capacitors. One is a storage-on-common type in which the storage capacitor is formed separately. The other is a storage-on-gate type in which a portion of gate line functions as a storage capacitor electrode. The former has a smaller effective area for forming the pixels than the latter. Therefore, the aperture ratio of such LCDs and the brightness of the display device is reduced.

In order to refine pictures on the display, the brightness of the backlight must be increased and the size of the untransmissive portion must be minimized. To increase the brightness of the backlight, more electricity (power) is required; however, such is undesirable because it is costly.

Many different methods have been developed to improve the aperture ratio of the LCDs, e.g., enlarging the area of pixel electrodes or enlarging the pixel size. To enlarge the pixel size, however, the other elements of the LCD such as gate bus lines, source bus lines, TFTs and so on, need to be minimized. But, photo-lithography and etching has a limit on minimizing these elements. Further, the width of bus lines cannot be reduced below a certain level. Therefore, it is difficult to manufacture LCDs with an improved aperture ratio. But, even if the pixel size were increased by the above methods, the aperture ratio is generally 40% or 50% at best.

To solve the problems described above, an LCD with a different structure has been proposed in which the display panel with an array of microlenses are formed on one side or both sides of the panel. Such a structure is disclosed in Japanese Laid-Open Patent Publications No. 60-262131 and No. 61-11788. Referring to FIG. 3, one of the advantages of such known display devices is that the light rays incident onto the portion of display panel which does not contribute to displaying, are focused on the pixel electrodes using elements 31 and pass through elements 32. As a result, the transmittance of the LCD having the same aperture ratio is increased.

Another proposal for further enhancing the above mentioned device is disclosed in U.S. Pat. No. 5,187,599. Referring to FIG. 4, such a display device comprises a first array of microlenses 31' disposed on the incident side of the display panel, and a second array of microlenses 32' disposed on the incident side of the other display panel, each microlens being disposed according to the respective pixels. The focal points of the first array of microlenses are identical with those of the second array of microlenses, and the focal length of each microlens in the first array is greater than that of the second array. Therefore, the light rays incident on the untransmissive portion of the display panel is redirected by condensing the diverging rays.

The above suggested structure of the LCD are to increase the transmittance of the light and to acquire the effect of having an increased aperture ratio, without actually increasing the aperture ratio. Each microlens covers the entire pixel electrode. The height of the microlenses need to be greater than 50 μm to cover the dimension of each pixel electrode having generally 100 μm×300 μm. However, in practice, it is difficult to form the LCD having microlenses greater than 50 μm in height, resulting relatively flat lenses. Accordingly, the transmittance of conventional LCDs cannot be effectively improved.

SUMMARY OF THE INVENTION

An object of the present invention is to provide an LCD which has an improved transmittance.

Another object of the present invention is to provide a brighter LCD with low power consumption.

Still another object of the present invention is to provide an LCD which has an improved contrast ratio.

Still another object of the present invention is to provide an LCD which overcomes the disadvantages and problems encountered in the conventional LCDs.

In order to achieve the above and other objects, an LCD according to the present includes multi-microlenses corresponding to the border of the untransmissive portions of the LCD. More particularly, the LCD according to the embodied invention includes first and second transparent substrates facing each other, a plurality of gate and data bus lines formed on the first substrate, a plurality of color filters formed on the second substrate, and a plurality of microlenses formed corresponding to the gate and data bus lines. In case that storage capacitor lines including storage capacitors are formed on the first substrate for storage capacitance, it is desirable to have a plurality of microlenses at the position corresponding to the storage capacitor lines in order to improve the transmittance.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

The LCDs according to the preferred embodiments of the present invention will be described with reference to FIGS. 5 through 17. The LCD according to the first through fourth embodiments of the present invention includes a plurality of microlenses for effectively redirecting light from a light source all onto the pixel electrodes of the LCD, with simplicity. Generally, a path of light is depicted in the Figures by a line with arrow.

FIGS. 8-11 show cross-sectional views of examples of an LCD according to the first embodiment of the present invention.

Figure 8:
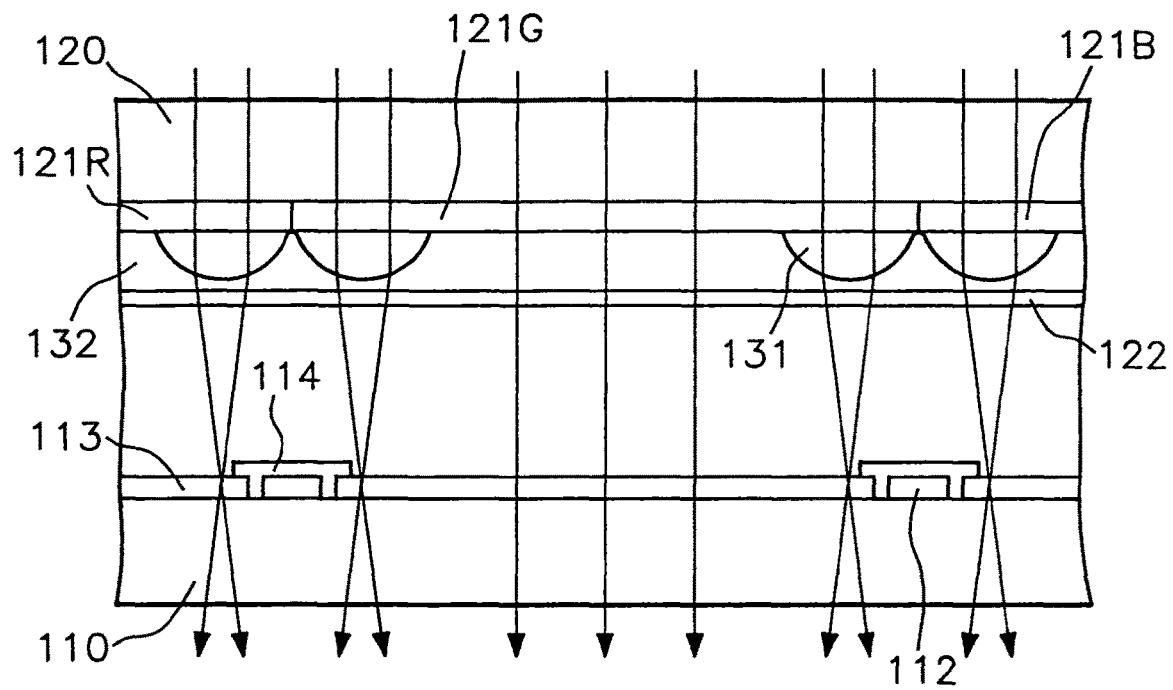
FIG. 8 is a cross-sectional view of an LCD according to a first example of a first embodiment of the present invention.

As shown in FIG. 8, the first example of the LCD according to the first embodiment of the present invention includes a plurality of microlenses 131 formed on a color filter layer 121 containing color filters 121R, 121G and 121B. The color filter layer 121 is formed on a second transparent glass substrate 120. The microlenses 131 are covered with an overcoat material, such as acrylic resin to form an overcoat layer 132. Common electrodes 122 are formed on the overcoat layer 132 and constitute a transparent conductive layer made of ITO. Pixel electrodes 113 are formed on a first transparent glass substrate 110, and a black matrix 114 is formed to cover gaps between the pixel electrodes 113 and data bus lines 112 and gaps between the pixel electrodes 113 and gate bus lines.

Figure 9:
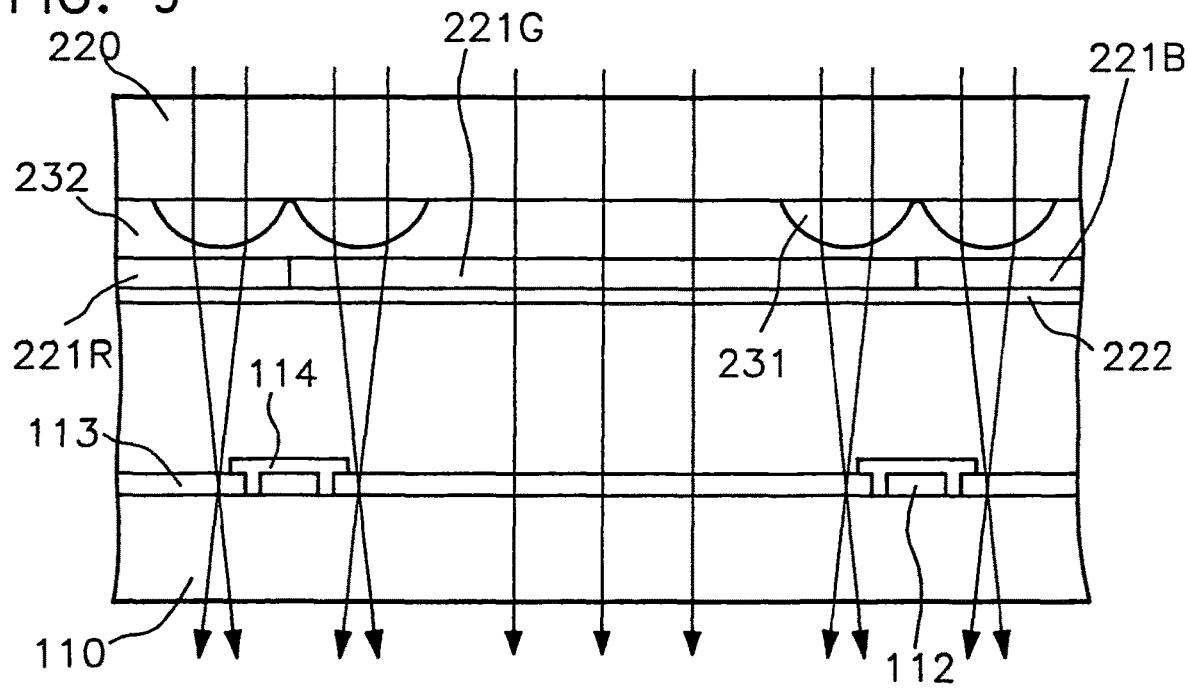
FIG. 9 is a cross-sectional view of an LCD according to a second example of the first embodiment of the present invention.

As shown in FIG. 9, the second example of the LCD according to the first embodiment of the present invention includes a plurality of microlenses 231 formed directly on a second glass substrate 220 and covered with an overcoat layer 232 made of acrylic resin. A color filter layer 221 having red, blue, and green filters 221R, 221B, 221G is then formed on the overcoat layer 232. On the color filter layer 221, common electrodes 222 are formed. Other elements, such as the data bus lines 112, pixel electrodes 113, black matrix 114 and gate bus lines are formed on the first substrate 110 in a manner similar to the LCD of FIG. 8.

Figure 10:
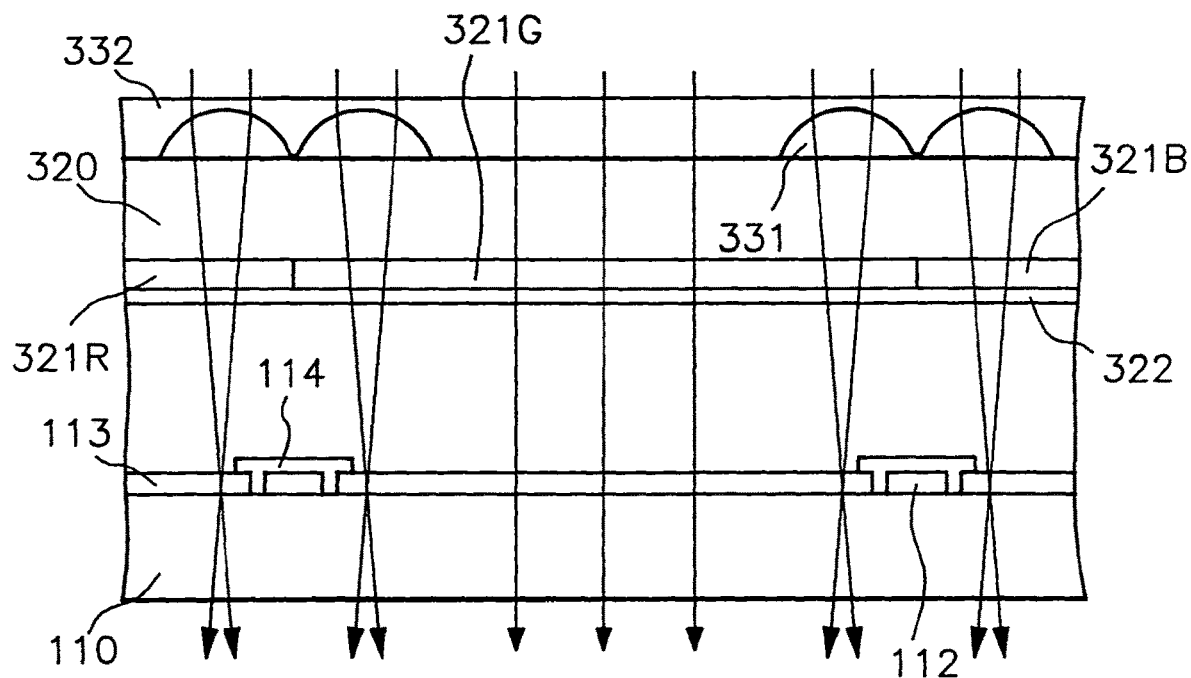
FIG. 10 is a cross-sectional view of an LCD according to a third example of the first embodiment of the present invention.

As shown in FIG. 10, the third example of the LCD according to the first embodiment of the present invention includes a plurality of microlenses 331 formed on the outer surface of a second transparent glass substrate 320. The microlenses 331 are covered with an overcoat layer 332 made of acrylic resin. On the inner surface of the second substrate 320, a color filter layer 321 having red, blue, and green filters 321R, 321B, 321G is formed. Then on the color filter layer 321, common electrodes 322 are formed. Other elements, such as the data bus lines 112, pixel electrodes 113, black matrix 114 and gate bus lines are formed on the first substrate 110, in a manner similar to the LCDs of FIGS. 8 and 9.

Figure 11:
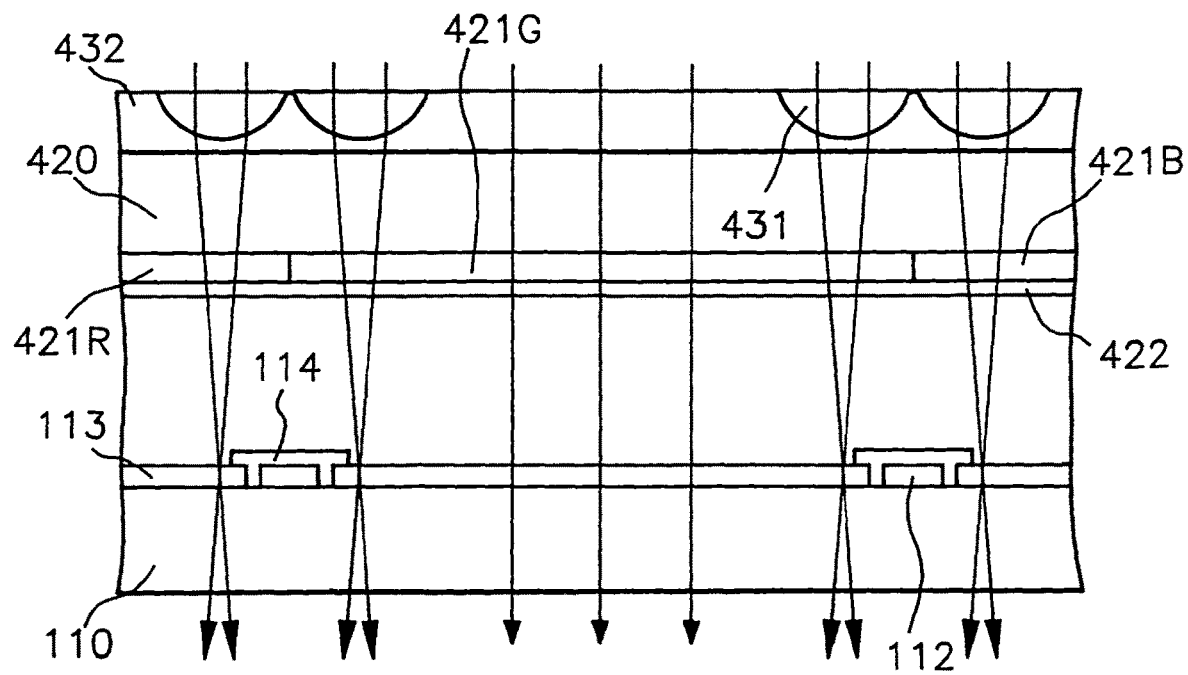
FIG. 11 is a cross-sectional view of an LCD according to a fourth example of the first embodiment of the present invention.

As shown in FIG. 11, the fourth example of the LCD according to the first embodiment of the present invention includes a plurality of microlenses 431 formed by selectively etching the outer surface portion of an overcoat layer 432 formed on a second transparent glass substrate 420. The spaces formed by etching the overcoat layer 432 are filled with a material different from the material constituting the overcoat layer 432 in refraction index. For example, the overcoat layer 432 may be formed of acrylic resin and the microlenses 431 may be formed of an organic material, such as benzocyclobutene ("BCB"). Similarly the overcoat layer 432 may be formed of BCB and the microlenses 431 may be formed of acrylic resin.

On the inner surface of the second substrate 420, a color filter layer 421 having red, blue and green filters 421R, 421B, 421G is formed. Then on the color filter layer 421, common electrodes 422 are formed. Other elements, such as the data bus lines 112, pixel electrodes 113, black matrix 114 and gate bus lines are formed on the first substrate 110, in a manner similar to the LCDs of FIGS. 8, 9 and 10.

The microlenses 131, 231, 331 and 431 are preferred to be about 6 µm in width and about 3 µm in height, in view of the distance between the color filter layer and data bus lines 112 (or gate bus lines), and in view of the width of each bus line and the refraction index of the microlenses.

According to the first embodiment, the light from the backlight, which is shielded by the bus lines in the conventional LCDs, is refracted when arriving at the surface of each microlens 131, 231, 331 and 431, and passes through the pixel electrodes 113 and first transparent glass substrate 110. As a result, almost all incident light can be transmitted, increasing the transmittance substantially.

In these cases, a micro black matrix whose width is narrower than that of bus lines can be additionally disposed between the color filters on the second transparent substrate, in order to further emphasize the color difference with clear boundaries.

Furthermore, according to the first embodiment of the present invention, the microlenses 131, 231, 331, and 431 are formed on the second substrate corresponding to the edge portions of the pixel electrodes and to cover the bus lines and the gaps between the bus lines and pixel electrodes. The middle portions of the pixel electrodes 113 may not be covered by the microlenses.

Figure 12:
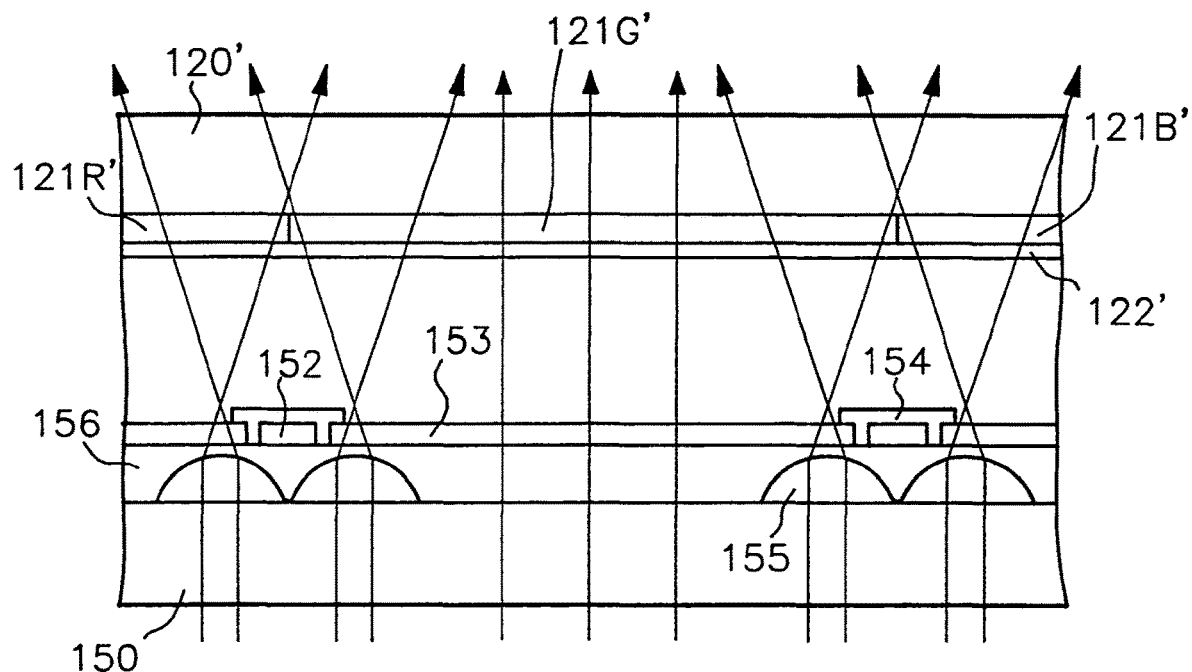
FIG. 12 is a cross-sectional view of an LCD according to a first example of a second embodiment of the present invention.
Figure 13:
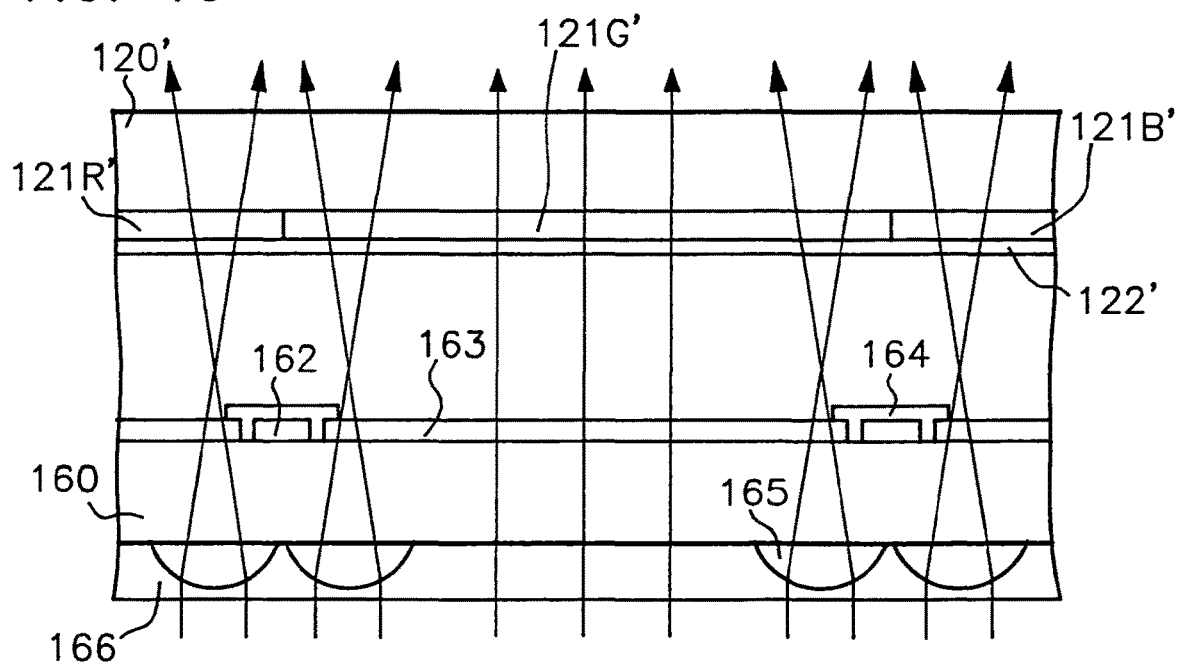
FIG. 13 is a cross-sectional view of an LCD according to a second example of the second embodiment of the present invention.
Figure 14:
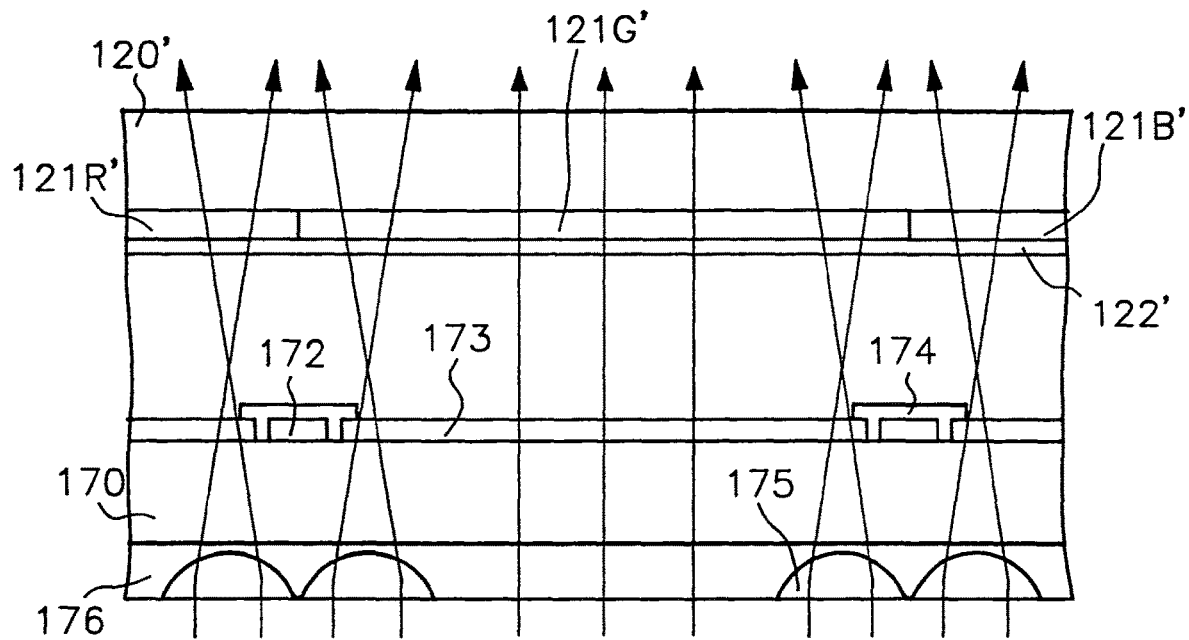
FIG. 14 is a cross-sectional view of an LCD according to a third example of the second embodiment of the present invention.

FIGS. 12-14 show cross-sectional views of examples of an LCD according to the second embodiment of the present invention. In the second embodiment, microlenses are disposed on the lower substrate and the backlight is disposed behind the lower substrate.

As shown in FIG. 12, the first example of the LCD according to the second embodiment of the present invention includes a plurality of microlenses 155 formed on the inner surface of a first transparent glass substrate 150. The microlenses 155 are covered with an overcoat layer 156 made of acrylic resin. On the overcoat layer 156, other elements, such as the data bus lines 152, pixel electrodes 153, a black matrix 154 and gate bus lines are formed.

In the upper substrate, a color filter layer 121' having red, blue and green filters 121R', 121B' and 121G' is formed on a second transparent glass substrate 120'. On the color filter layer 121', common electrodes 122' are formed.

Further, the backlight is disposed behind the first transparent substrate 150 and directs the light toward the second transparent substrate 120'. The incident light is focused by the microlenses 155 so that it is directed to the pixel electrodes 153 and not to the data and gate bus lines. As a result, the microlenses 155 redirect light which would have been blocked and scattered by the bus lines onto the edge portions of the pixel electrodes 153. Accordingly, the transmittance is increased and the LCD with an increased brightness and increased power efficiency is produced.

As shown in FIG. 13, the second example of the LCD according to the second embodiment of the present invention includes a plurality of microlenses 165 formed on the outer surface of a first transparent glass substrate 160. These microlenses 165 are covered with an overcoat layer 166 made of benzocyclobutene or acrylic resin. On the inner surface of the first transparent substrate 160, other elements, such as data bus lines 162, pixel electrodes 163, a black matrix 164 and gate bus lines are formed.

In the upper substrate, common electrodes 122', a color filter layer 121' having color filters 121R', 121B', 121G', and a second transparent glass substrate 120' are formed in a manner similar to the upper substrate of the LCD in FIG. 12.

As shown in FIG. 14, the third example of the LCD according to the second embodiment of the present invention includes a plurality of microlenses 175 formed by selectively etching the outer surface portion of an overcoat layer 176 formed on a first transparent glass substrate 170. The spaces formed by etching the overcoat layer 176 may be filled with a material such as acrylic resin or BCB. For example, if the overcoat layer 176 is made of acrylic resin, the spaces may be filled with BCB. If the overcoat layer 176 is made of BCB, the spaces may be filled with acrylic resin. On the inner surface of the first transparent substrate 170, other elements, such as data bus lines 172, pixel electrodes 173, a black matrix 174 and gate bus lines are formed.

In the upper substrate, common electrodes 122', a color filter layer 121' having color filters 121R', 121B', 121G', and a second transparent glass substrate 120' are formed in a manner similar to the LCDs of FIGS. 12 and 13.

According to the second embodiment of the present invention, the light source is positioned at the backside of the first transparent glass substrate 150, 160 and 170. When the light from the light source hits the surface of the microlenses 155, 165 and 175, it is refracted. That is, the light which is blocked by the gate and data bus lines in the conventional LCDs is refracted as it passes through the microlenses. The refracted light then passes through the pixel electrodes 153, 163 and 173 and the second transparent substrate 120'. As a result, almost all incident light can be transmitted and the transmittance is consequently increased.

In these cases, a micro black matrix whose width is less than that of the bus lines can be additionally disposed between the color filters on the second transparent substrate, to emphasize the different colors.

Figure 15:
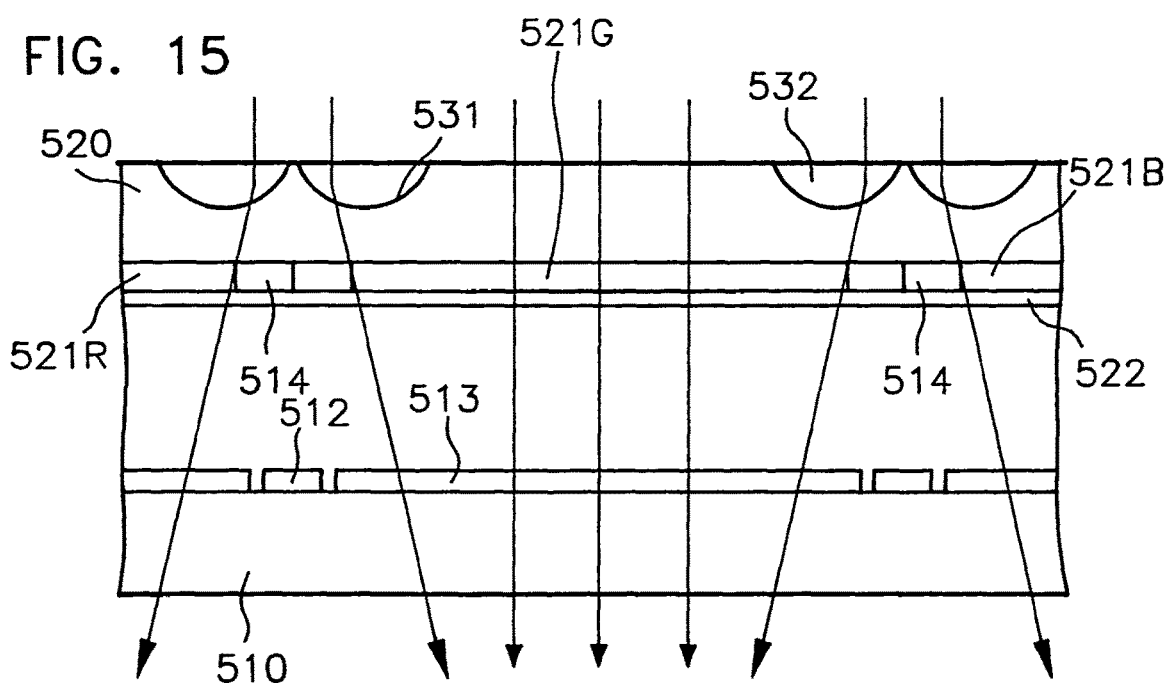
FIG. 15 is a cross-sectional view of an LCD according to a first example of a third embodiment of the present invention.
Figure 16:
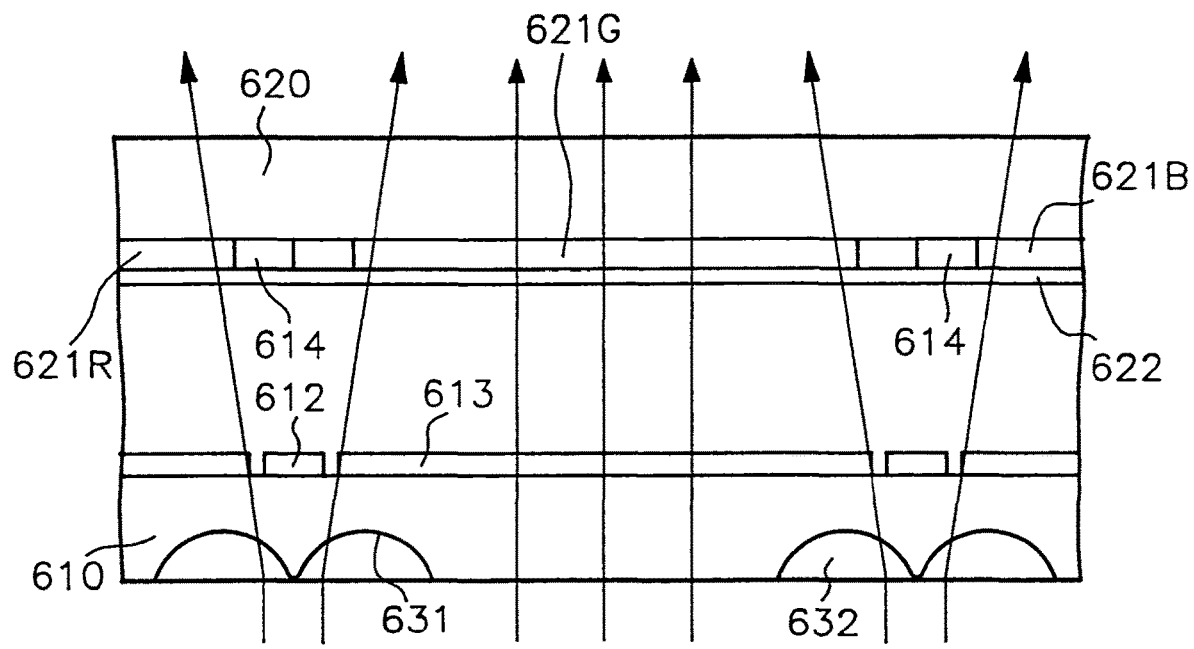
FIG. 16 is a cross-sectional view of an LCD according to a second example of the third embodiment of the present invention.

FIGS. 15 and 16 show cross-sectional views of examples of an LCD according to the third embodiment of the present invention.

As shown in FIG. 15, the first example of the LCD according to the third embodiment of the present invention includes a plurality of microlenses 531 formed by selectively etching the outer surface portion of a second transparent glass substrate 520. The spaces formed by etching the second substrate 520 may be filled with a material 532, such as acrylic resin.

On the inner surface of the second transparent substrate 520, a color filter layer 521 having red, blue and green filters 521R, 521B and 521G is formed. Between these color filters, a black matrix 514 having a width larger than the width of each bus line is formed, in accordance with the joining margin of the second transparent substrate 520 and a first transparent glass substrates 510. On the color filter layer 521, common electrodes 522 are formed.

In the lower substrate, data bus lines 512, pixel electrodes 513, and gate bus lines are formed on the first transparent glass substrate 510.

Here, a backlight is located behind the second substrate 520. The light which would have been blocked by the black matrix 514 is redirected onto the color filter layer 521 and passes through the pixel electrodes 513.

As shown in FIG. 16, the second example of the LCD according to the third embodiment of the present invention includes a plurality of microlenses 631 formed in the lower substrate. By selectively etching the outer surface portion of the first transparent glass substrate 610, the microlenses 631 are shaped. The spaces formed by etching the first substrate 610 may be filled with a material 632, such as an acrylic resin.

On the inner surface of the first transparent substrate 610, data bus lines 612, pixel electrodes 613, and gate bus lines are formed. In the upper substrate, a color filter layer 621 having red, blue and green filters 621R, 621B and 621G is formed on a second transparent glass substrate 620. Between these color filters, a black matrix 614 having a width larger than the width of each bus line is formed, in accordance with the joining margin of the first and second transparent substrates 610 and 620. On the color filter layer 621, common electrodes 622 are formed.

Here, the backlight is located behind the first substrate 610. The light which would have been blocked by the black matrix 614 is redirected onto the color filter layer 621 and passes through the pixel electrodes 613.

Therefore, according to the third embodiment of the present invention, the transmittance and aperture ratio of the LCD is increased with increased power efficiency.

Figure 17:
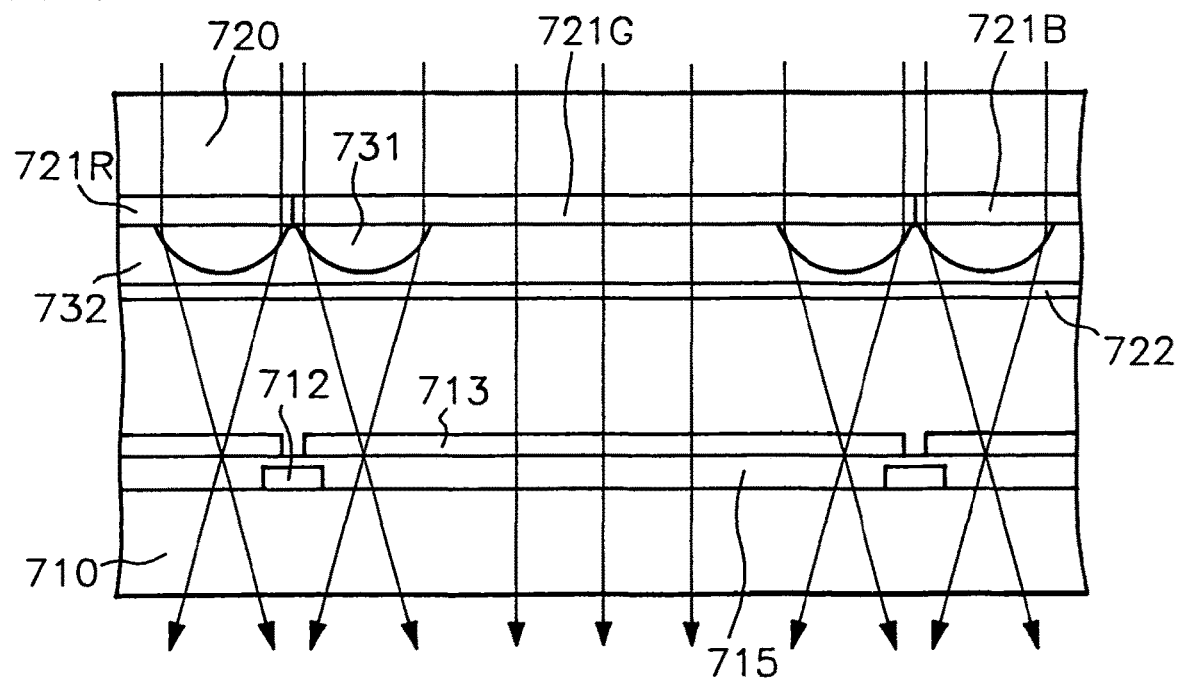
FIG. 17 is a cross-sectional view of an LCD according to an example of a fourth embodiment of the present invention.

FIG. 17 shows a cross-sectional view of an LCD according to the fourth embodiment of the present invention.

The LCDs according to the first and second embodiments comprise a BM (black matrix) formed on arrays of TFTs formed on a first substrate. The transmittance can be increased by enlarging the size of pixel electrodes, avoiding the BM-on-array structure. The LCD according to the fourth embodiment of the present invention is formed with enlarged pixel electrodes, which includes pixel electrodes formed on a passivation layer made of benzocyclobutene.

The LCD according to the fourth embodiment further includes microlenses formed at each pixel border area of the color filter layer corresponding to the gate bus lines and the data bus lines. The microlenses 731 are covered with an overcoat layer 732 made of an organic film such as BCB or acrylic resin. The overcoat layer is formed to enhance stability in rubbing and to improve leveling. The overcoat layer may not be necessary if stability in rubbing and improvement in leveling are already obtained.

This embodiment provides pixel electrodes 713 larger than those of an LCD comprising a typical BM-on-array structure.

As shown in FIG. 17, the LCD includes a plurality of microlenses 731 formed on the inner surface of a color filter layer 721. The color filter layer having red, green and blue filters 721R, 721G and 721B is formed on the inner surface of a second transparent glass substrate 720. On the microlenses 731, an overcoat layer 732 made of benzocyclobutene is formed, and common electrodes 722 are formed thereon.

In the lower substrate, a passivation layer 715 made of an organic material, such as benzocyclobutene is formed between data bus lines 712 and pixel electrodes 713, so that larger pixel electrodes can be formed. A black matrix is formed only on the gate bus lines formed on a first transparent glass substrate 710.

In the fourth embodiment of the present invention, a light from the backlight travels straight through the second substrate 720 and is refracted at the surface of the microlenses 731. The refracted light impinges on the pixel electrodes 713, but not on the gate and data bus lines. Consequently, most of the light from the light source is transmitted through the first transparent glass substrate 710.

According to the first through fourth embodiments of the present invention, when the microlenses (131, 155, 165, 175, 231, 331, 431, 531, 631 and 731) are formed at the positions corresponding to the gate and source bus lines, almost no incident light is lost. Consequently, the aperture ratio is improved up to 90%, compared to at most 70% in the conventional LCDs. Therefore, an LCD which is driven by a low power and has a high transmittance is obtained.

With respect to forming the microlenses, a discussion on how large the scale of microlenses is and where the microlenses are formed is provided below.

In order to design the microlenses for condensing or dispersing the incident light, the relationship between the incident angle and the refracted angle of the light is considered. The refraction angle of the light is calculated from the following equation (1) known as the Snell's law, which shows the relationship between refraction indices and refraction angles.

$$n_2/n_1 = \sin\theta_1/\sin\theta_2 \quad (1)$$

According to the equation (1), the refraction angle $\theta_2$ of incident light at an angle $\theta_1$ to the normal line of each microlens is determined by the refraction index of the material ($n_1$) of the microlens and the refraction index of the material ($n_2$) being in contact with the microlens.

In the present invention, considering the effects of the microlenses and easiness of making them, microlenses having the width of 4 μm-30 μm and the height of greater than 0.5 μm are suggested.

The microlenses according to the embodiments of the present invention are formed at the positions according to the gate bus lines and the data bus lines so as to obtain the best effect. In a case where the light source is positioned at the backside of the second substrate having a color filter layer, it is desirable to form the microlenses on the outer or inner side of the second substrate. In a case where the light source is positioned at the backside of the first substrate having pixel electrodes, it is desirable to form the microlenses on the outer or inner side of the first substrate. However, the position of the microlenses is not restricted to the above. That is, as long as the microlenses function to focus and redirect the light which travels to the gate bus lines and the data bus lines, the shape of microlenses can be varied.

FIGS. 5A-7B are cross-sectional and plan views showing examples of different configurations and shapes of microlenses for the LCDs according to the present invention. These examples are applicable to the first through fourth embodiments of the present invention. Each of the microlenses of the present invention can be formed to be equal to or greater (e.g., more than 30 µm) than each line width at the positions corresponding to the gate data lines and data bus lines.

Figure 1:
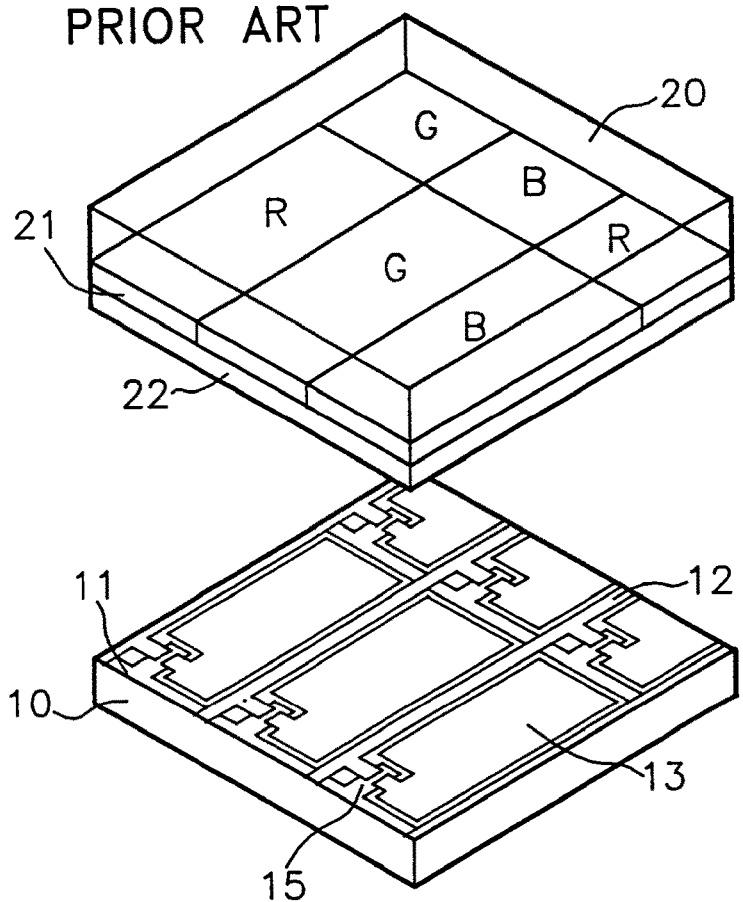
FIG. 1 is a three-dimensional view showing a structure of a conventional LCD.
Figure 2:
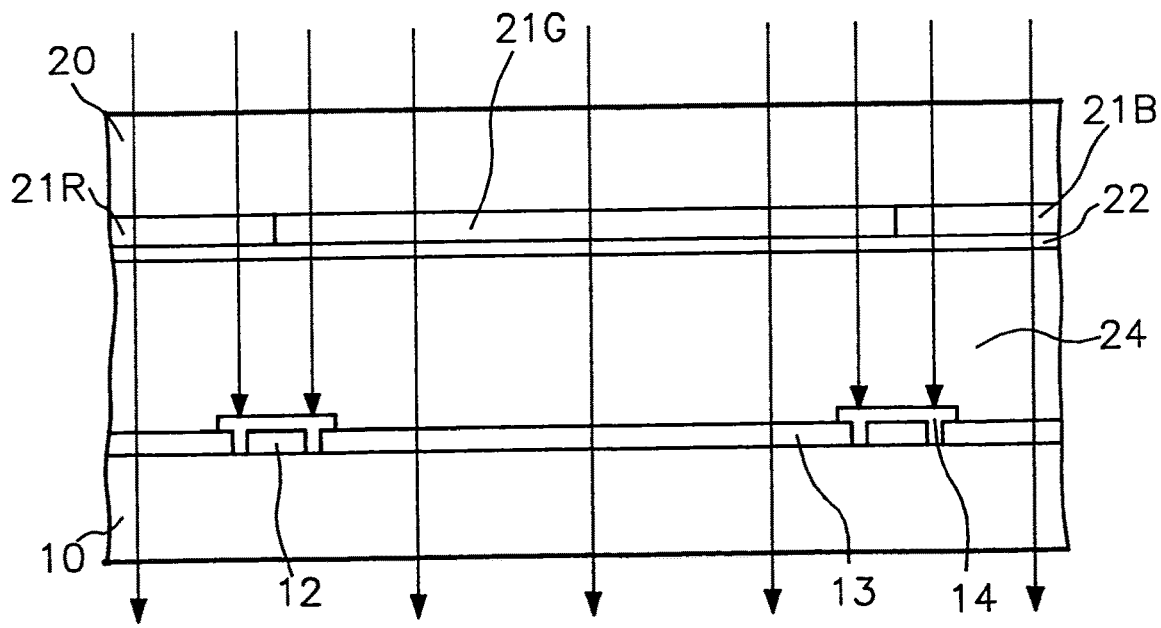
FIG. 2 is a partial, cross-sectional view showing a light path in the conventional LCD of FIG. 1.
Figure 3:
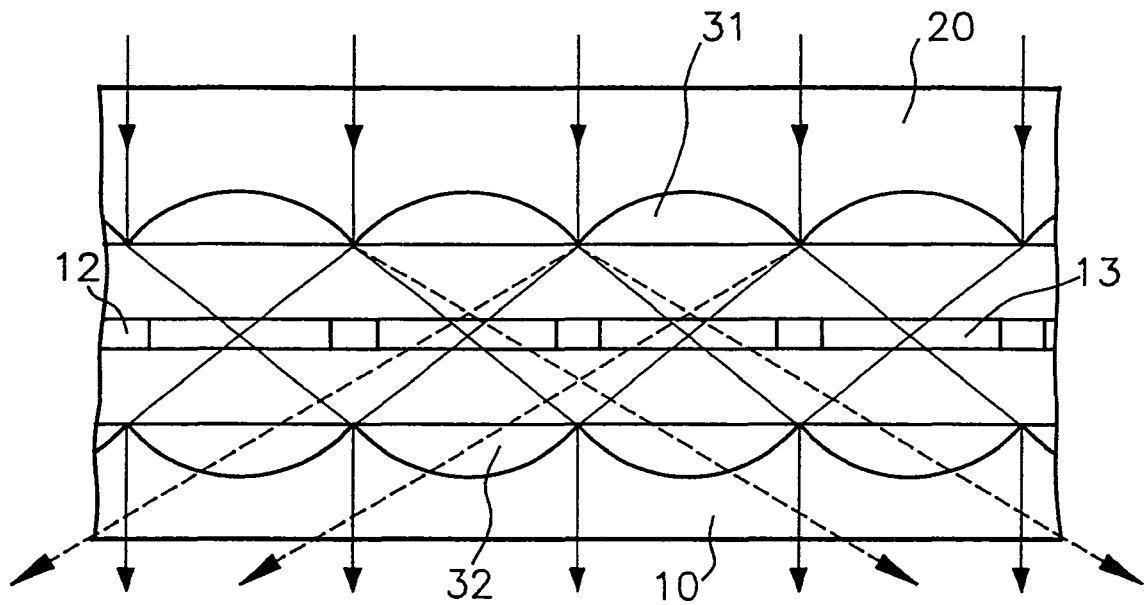
FIG. 3 is a cross-sectional view showing a light path in a conventional LCD.
Figure 4:
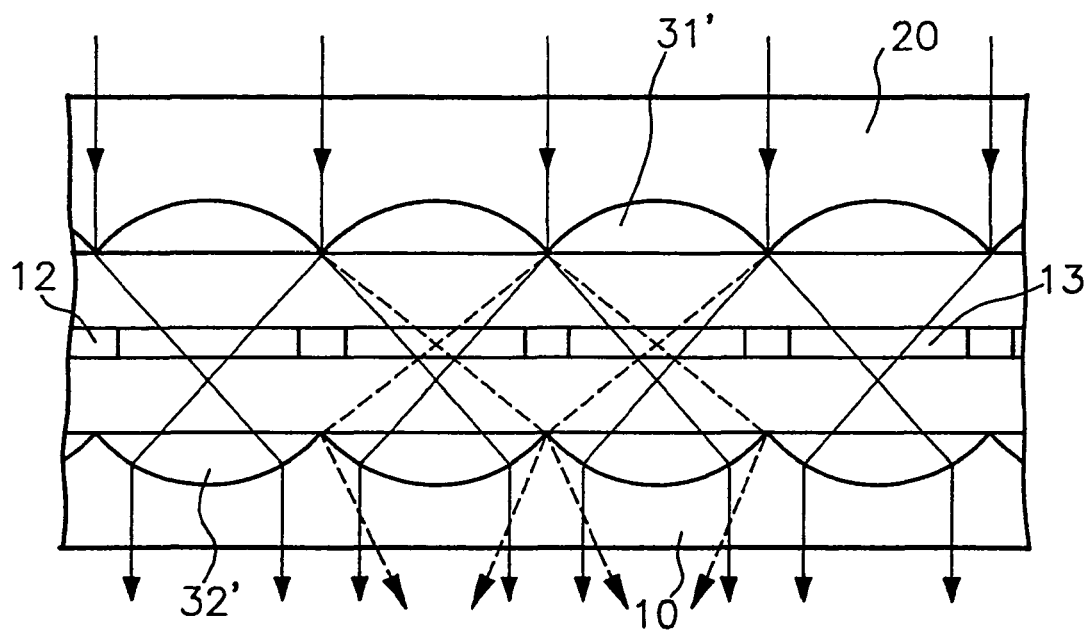
FIG. 4 is a cross-sectional view showing a light path in another conventional LCD.
Figure 5A:
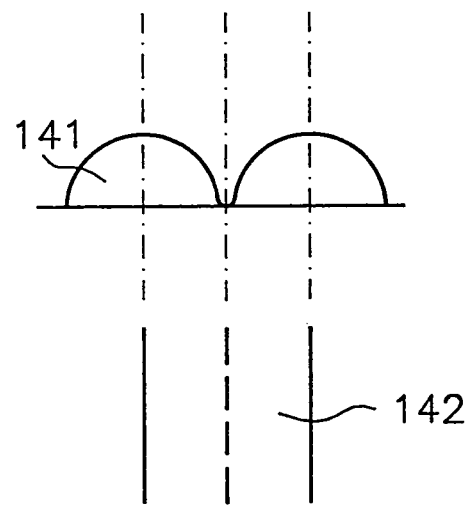
FIGS. 5A-5B, 6A-6B, and 7A-7B are cross-sectional views showing examples of different configurations and shapes of microlenses for an LCD according to the embodiments of the present invention.
Figure 5B:
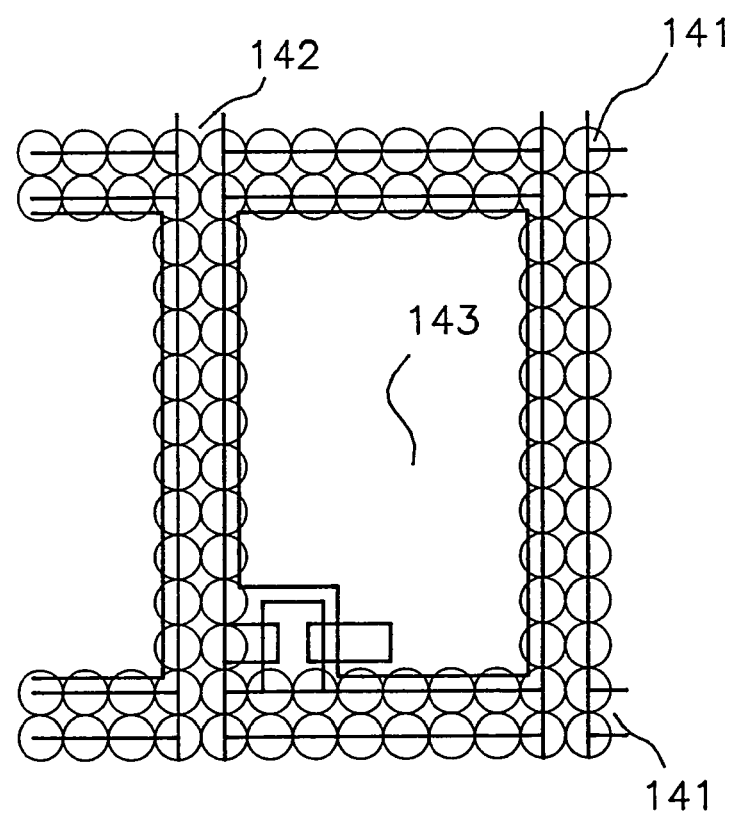
Figure 6A:
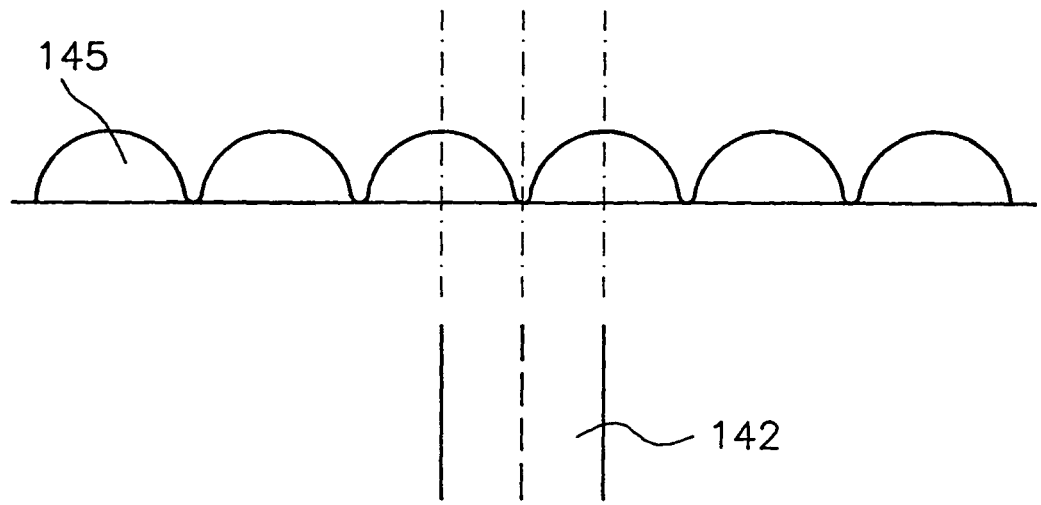
Figure 6B:
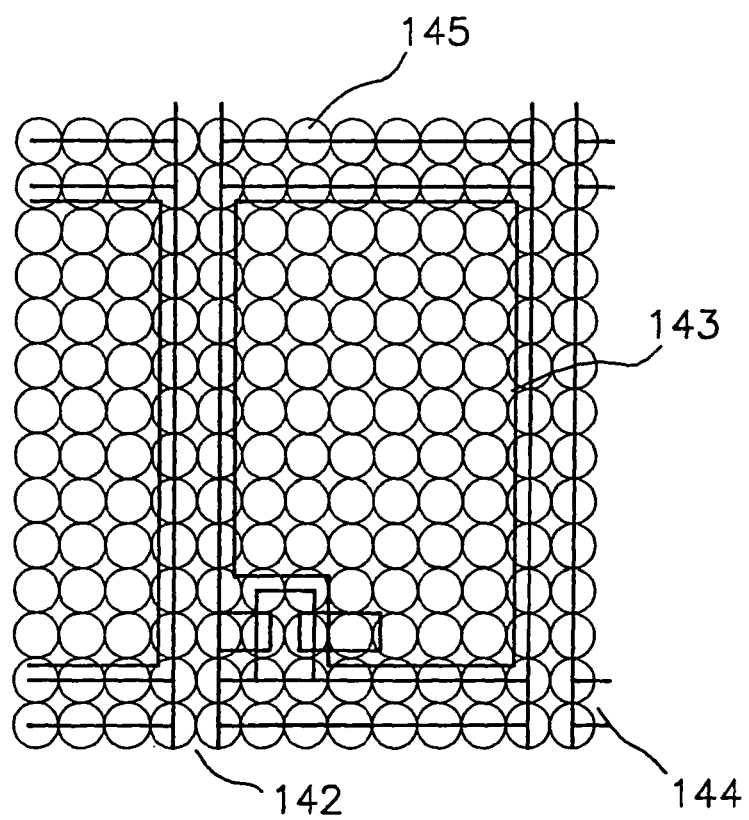

As shown in FIGS. 5A and 5B, the microlens (141) cover each data bus line 142 and each gate bus line 144. The microlenses 141 are positioned so that the border therebetween is substantially aligned with the center of each bus line (shown by the dotted line). Also, a width of the gate bus line 144 or the data bus line 142 extends substantially between centers of the micro lenses (141). Two microlenses (141) are disposed over the gate bus lines (144) in a width direction of each gate bus line (144), and two microlenses (141) are disposed over the data bus lines (142) in a width direction of each data bus line (142). The two microlenses 141 are positioned so that the border therebetween is substantially aligned with the center of each bus line (shown by the dotted line). As further shown by FIG. 5B, at least three microlenses are disposed over each of the gate and data bus lines corresponding to one pixel in a length direction. In FIGS. 6A and 6B, moreover, the microlenses (145) can also be formed at any position in the LCD panel, including where the pixel electrodes 143 are.

Figure 7A:
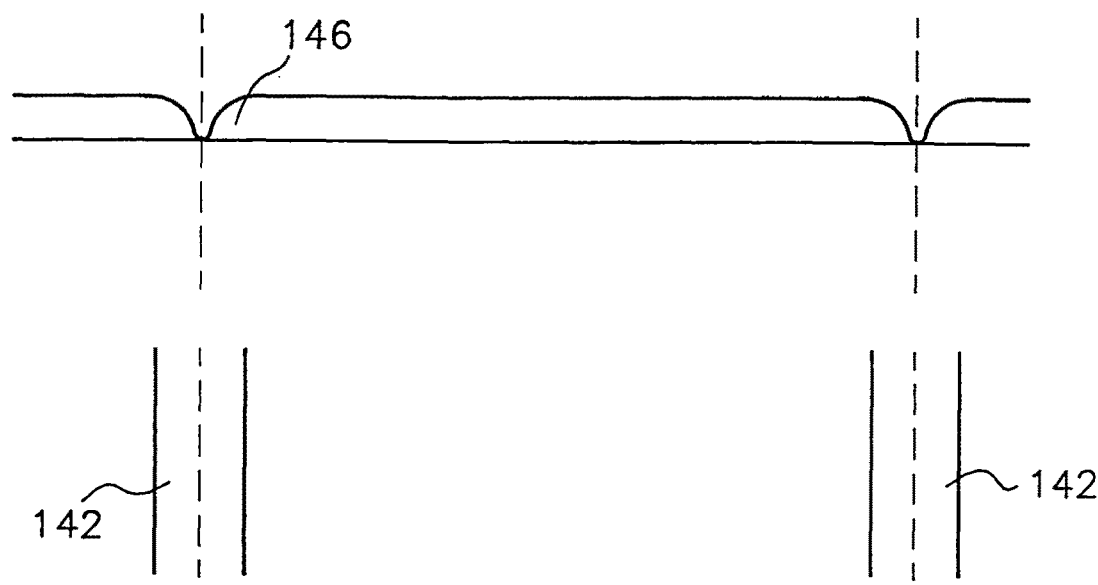
Figure 7B:
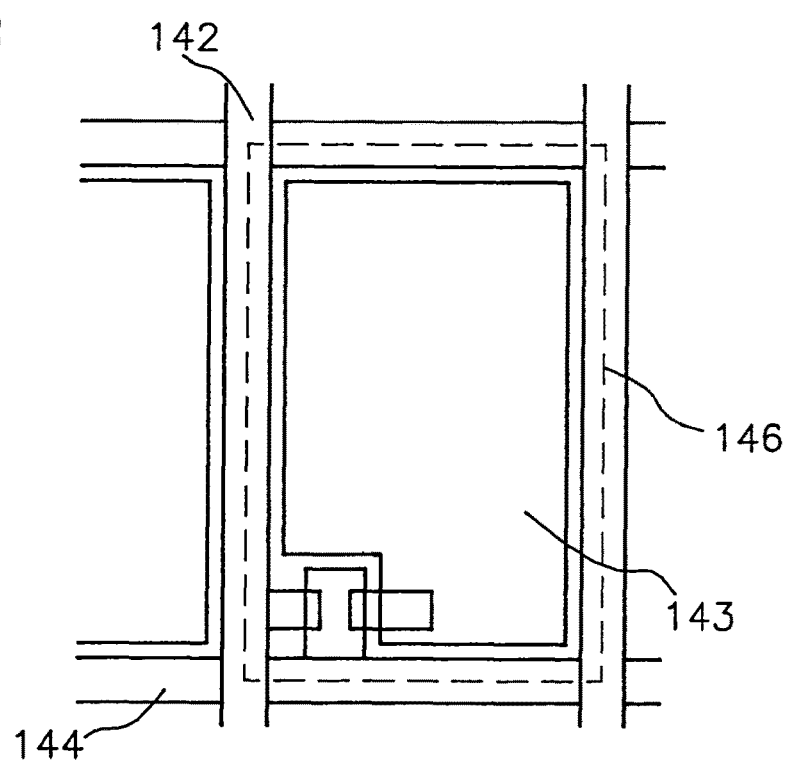

As shown in FIGS. 7A and 7B, the microlens (146) having the same size as the color filter layer can be formed at a position corresponding to each color filter layer, covering the corresponding array of pixel electrodes 143. The microlens 146 includes edge portions which are curved and which cover the area in which the color filter layer overlaps the gate bus lines 141 and data bus lines 142. These edge portions correspond to a light shielding area (non-transmissive portion), such as gate and data bus lines, a black matrix, and storage capacitor lines. The shape of the edge portions allows the incident light to be focused onto the transmissive portion. The microlens 146 further includes a substantially flat portion for allowing the light to pass straight through the pixel electrodes 143.

The microlenses according to the first through fourth embodiments of the present invention can be made of a different material or can be formed by patterning LCD elements such as a color filters, pixel electrodes, insulating layers, a transparent glass substrate, etc. into the shape of a lens. As described above, an overcoat layer is formed on the microlenses for increased stability in rubbing and upgrading the uniformity of the substrate surface.

According to the present invention, although the amount of an incident light is not increased, the amount of the transmitted light is increased. In other words, though the aperture ratio, namely the size of transmissive portion, is not increased, the same effect of having an increased aperture ratio is achieved.

The effect of the present invention is increased when it is applied to the LCD structures, in which the pixel electrodes overlap the data bus lines and an organic insulator such as BCB is inserted between the pixel electrodes and the bus lines, for increasing the size of the pixels. The effect is also increased by forming a black matrix (BM-on-array) on the first transparent glass substrate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display device comprising:
   a substrate;
   a plurality of gate bus lines and a plurality of data bus lines intersecting the plurality of gate bus lines on the substrate;
   a plurality of pixel regions arranged between the plurality of data bus lines and the plurality of gate bus lines on the substrate;
   a plurality of pixel electrodes on the substrate at each of the plurality of pixel regions; and
   a plurality of microlenses over the substrate,
   wherein at least three microlenses among the plurality of microlenses are corresponded to each of the pixel electrodes in a width direction of the each of the pixel electrodes, and at least one microlens adjacent to the at least three microlenses is corresponded to one of the plurality of data bus lines,
   wherein at least two microlenses among the plurality of microlenses are corresponded to each of the gate or data bus lines in a width direction of each of the gate or data bus lines, and
   wherein at least one microlens among the at least two microlenses that is overlapped with one data bus line does not overlap with the other data bus lines.

2. The display device according to claim 1, wherein each of the plurality of microlenses is a concave lens.

3. The display device according to claim 2, wherein edges of two adjacent microlenses at a border between the plurality of microlenses form an acute angle.

4. The display device according to claim 1, wherein each of the plurality of microlenses is a convex lens.

5. The display device according to claim 1, further comprising:
   a light source located over the substrate on which the plurality of microlenses are formed.

6. The display device according to claim 1, further comprising:
   a light source positioned at a backside of the plurality of microlenses.

7. The display device according to claim 1, further comprising an overcoat layer,
   wherein the plurality of microlenses are formed by selectively etching an outer surface portion of the overcoat layer.

8. The display device according to claim 7, wherein the plurality of microlenses are covered with a different material from the overcoat layer.

9. The display device according to claim 7, wherein the plurality of microlenses are covered with a material having a different refractive index from that of the overcoat layer.

10. The display device according to claim 1, further comprising
an overcoat layer, and
a color filter layer over the substrate,
wherein the color filter layer is positioned between the overcoat layer and the substrate.

11. A display device comprising:
a substrate;
a plurality of pixels on the substrate, the plurality of pixels having a plurality of gate bus lines and a plurality of data bus lines; and
a plurality of microlenses over the substrate,
wherein at least three microlenses among the plurality of microlenses are corresponded to each of the pixel electrodes in a width direction of the each of the pixel electrodes, and at least one microlens adjacent to the at least three microlenses is corresponded to one of the plurality of data bus lines,
wherein at least two microlenses among the plurality of microlenses correspond to each of the gate or data bus lines in a width direction of each of the gate or data bus lines, and
wherein the at least two microlenses correspond to one pixel.

12. The display device according to claim 11, wherein each of the plurality of microlenses is a concave lens.

13. The display device according to claim 12, wherein edges of two adjacent microlenses at a border between the plurality of microlenses form an acute angle.

14. The display device according to claim 11, wherein each of the plurality of microlenses is a convex lens.

15. The display device according to claim 11, further comprising a light source located over the substrate on which the plurality of microlenses are formed.

16. The display device according to claim 11, further comprising:
a light source positioned at a backside of the plurality of microlenses.

17. The display device according to claim 11, further comprising an overcoat layer,
wherein the plurality of microlenses are formed by selectively etching an outer surface portion of the overcoat layer.

18. The display device according to claim 17, wherein the plurality of microlenses are covered with a different material from the overcoat layer.

19. The display device according to claim 17, wherein the plurality of microlenses are covered with a material having a different refractive index from that of the overcoat layer.

20. The display device according to claim 11, further comprising:
an overcoat layer; and
a color filter layer over the substrate,
wherein a color filter layer is positioned between the overcoat layer and the substrate.

* * * * *